United States Patent
Kim et al.

(10) Patent No.: US 9,811,160 B2
(45) Date of Patent: Nov. 7, 2017

(54) MOBILE TERMINAL AND METHOD FOR CONTROLLING THE SAME

(71) Applicant: Samsung Display Co., Ltd., Yongin, Gyeonggi-Do (KR)

(72) Inventors: Jung-Taek Kim, Seoul (KR); Kyoung Ho Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 47 days.

(21) Appl. No.: 14/590,417

(22) Filed: Jan. 6, 2015

(65) Prior Publication Data
US 2016/0004304 A1    Jan. 7, 2016

(30) Foreign Application Priority Data
Jul. 7, 2014   (KR) .................. 10-2014-0084676

(51) Int. Cl.
| | |
|---|---|
| *G09G 5/00* | (2006.01) |
| *G06F 3/01* | (2006.01) |
| *G09G 5/10* | (2006.01) |
| *G06F 1/16* | (2006.01) |
| *G06F 3/03* | (2006.01) |
| *G06F 1/32* | (2006.01) |
| *H04M 1/725* | (2006.01) |

(52) U.S. Cl.
CPC ............ *G06F 3/013* (2013.01); *G06F 1/1626* (2013.01); *G06F 1/1694* (2013.01); *G06F 1/3206* (2013.01); *G06F 1/3265* (2013.01); *G06F 3/017* (2013.01); *G06F 3/0304* (2013.01); *G09G 5/10* (2013.01); *H04M 1/72522* (2013.01); *G06F 2200/1614* (2013.01); *G06F 2200/1637* (2013.01); *G06F 2203/04806* (2013.01); *G09G 2320/0261* (2013.01); *G09G 2340/0492* (2013.01); *G09G 2360/144* (2013.01); *H04M 2250/12* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2005/0104848 A1* | 5/2005 | Yamaguchi ........... | G06F 1/1626 345/156 |
| 2008/0055231 A1* | 3/2008 | Nose .................... | G09G 3/3406 345/102 |

(Continued)

FOREIGN PATENT DOCUMENTS

| | | |
|---|---|---|
| KR | 10-2005-0116090 | 12/2005 |
| KR | 10-2007-0040087 | 4/2007 |

(Continued)

*Primary Examiner* — Martin Mushambo
(74) *Attorney, Agent, or Firm* — H.C. Park & Associates, PLC

(57) ABSTRACT

A mobile terminal according to an exemplary embodiment includes: at least one sensor; a display unit; and a host processor receiving data detected by the sensor and processing image data of which a display is changed according to the data. The display unit includes: a display panel displaying the image according to the image data; and a local processor receiving the data detected by the sensor and controlling the display panel by using the data without intervention of the host processor.

17 Claims, 11 Drawing Sheets

(56) References Cited

U.S. PATENT DOCUMENTS

| | | | |
|---|---|---|---|
| 2009/0239579 A1* | 9/2009 | Lee | G06F 1/1626 |
| | | | 455/556.1 |
| 2010/0110096 A1* | 5/2010 | Satoh | G01J 1/4204 |
| | | | 345/589 |
| 2010/0194699 A1* | 8/2010 | Chang | G06F 3/044 |
| | | | 345/173 |
| 2010/0277505 A1* | 11/2010 | Ludden | G06F 3/0416 |
| | | | 345/634 |
| 2011/0001687 A1* | 1/2011 | Srinivasan | G06F 3/1431 |
| | | | 345/3.1 |
| 2012/0105490 A1* | 5/2012 | Pasquero | G06F 3/013 |
| | | | 345/690 |
| 2012/0135783 A1* | 5/2012 | Sams | G06T 15/60 |
| | | | 455/556.1 |
| 2012/0218179 A1* | 8/2012 | Oba | H04N 21/4223 |
| | | | 345/156 |
| 2013/0176341 A1* | 7/2013 | Jung | G09G 5/00 |
| | | | 345/649 |
| 2013/0201112 A1 | 8/2013 | Large et al. | |
| 2013/0215041 A1* | 8/2013 | Kim | G06F 3/0487 |
| | | | 345/173 |
| 2014/0333544 A1* | 11/2014 | Mankowski | G06F 3/0412 |
| | | | 345/173 |

FOREIGN PATENT DOCUMENTS

| | | |
|---|---|---|
| KR | 10-2011-0093290 | 8/2011 |
| KR | 10-2013-0115452 | 10/2013 |

\* cited by examiner

FIG. 11
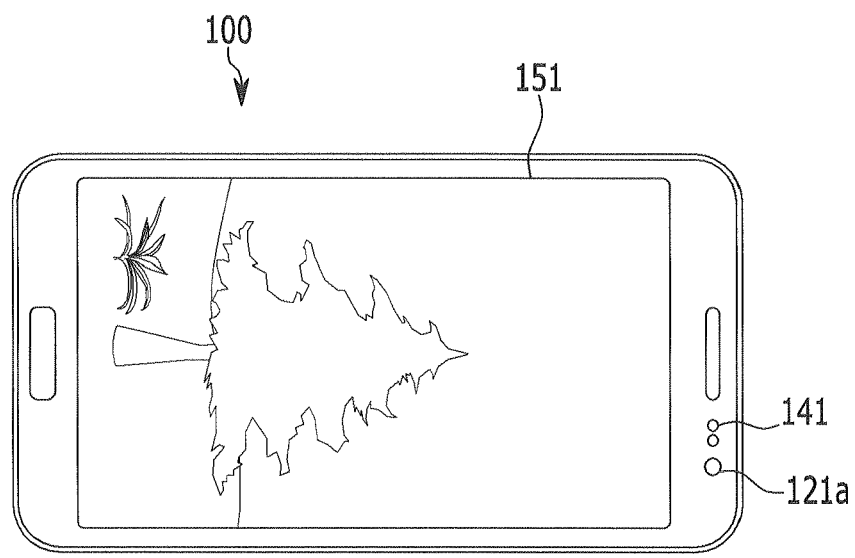
(a)
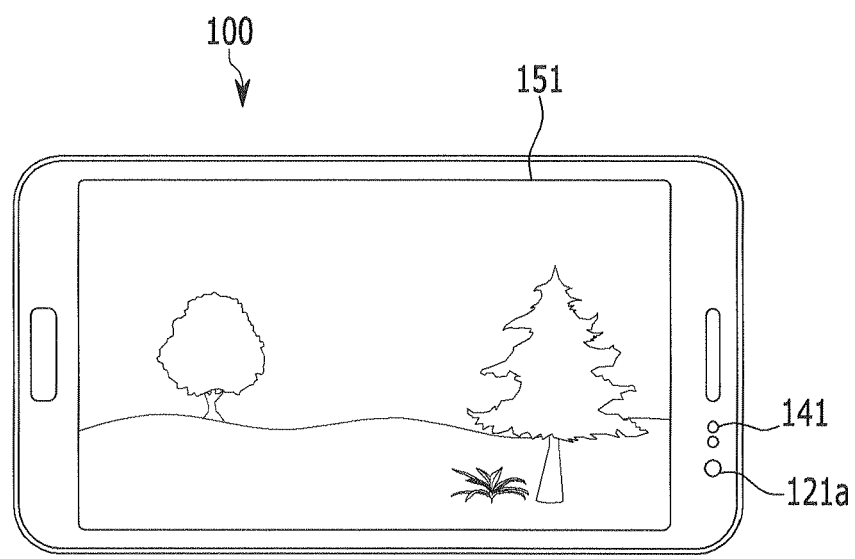
(b)

MOBILE TERMINAL AND METHOD FOR CONTROLLING THE SAME

CLAIM OF PRIORITY

This application makes reference to, incorporates the same herein, and claims all benefits accruing under 35 U.S.C. §119 from an application earlier filed in the Korean Intellectual Property Office on 7 Jul. 2014 and there duly assigned Serial No. 10-2014-0084676.

BACKGROUND OF THE INVENTION

Field of the Invention

Exemplary embodiments of present invention provide a mobile terminal with decreased power consumption according to an image display and realizing usage of a terminal further considering convenience of a user, and a method for controlling the same.

Description of the Related Art

Terminals may be classified into a mobile terminal (a mobile/portable terminal) and a stationary terminal according to a mobile function. Further, the mobile terminal may be classified into a portable terminal (a handheld terminal) and a vehicle mounted terminal according to a direct portable function of the user.

The function of the mobile terminal has been diversified. For example, there are data and voice communication, photos and videos taken with a camera, a voice recorder, playing of music files via a speaker system, and an image display function outputting the image or the video on a display unit. A partial terminal may have an electronic game play function or perform a multimedia player function. Particularly, the recent mobile terminal may receive a multicast signal providing visual contents such as broadcasting, video, or television programs.

These terminals may be realized with a multimedia player shape and have complex functions such as recording of a picture or motion picture, playback of music or motion picture files, gaming, and reception of broadcasting as the functions are diversified.

Because of an increase in functionality of and an increase in market demand for these terminals, improvements in the structural portion and/or the software portion of these terminals may be considered.

The terminals are required to process data of several steps to display the image on the display unit or to change and display the image to be displayed such that there is a problem that the image display may be delayed.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention have been made in an effort to solve the above-mentioned problem and other problems. Exemplary embodiments of the present invention have been made in an effort to provide a mobile terminal with reduced power consumption by considering surrounding illumination and a method for controlling the same.

Exemplary embodiments of the present invention have been made in a further effort to provide a mobile terminal that quickly executes focusing of an object in photography and video photography through a camera, and a method for controlling the same.

An exemplary embodiment of the present invention discloses that a mobile terminal includes: at least one sensor; a display unit; and a host processor receiving a data detected by the sensor and processing image data of which a display is changed according to the data. The display unit includes: a display panel displaying the image according to the image data; and a local processor receiving the data detected by the sensor and controlling the display panel by using the data without intervention of the host processor.

At least one sensor may include an illumination sensor, and the local processor may control brightness of the display panel by using illumination data detected by the illumination sensor.

At least one sensor may include a camera, and the local processor may receive photography image data photographed by the camera and may rotate the image to be displayed by considering an arrangement relation of at least one characteristic point detected in the photography image.

The local processor may detect an eye of the user in the photography image, and may detect a separation distance between the user and the mobile terminal to expand the region corresponding to the eye of the user in the image to be displayed if the separation distance is changed.

The local processor may control an exposure degree of the camera by using the illumination data.

The local processor may output coordinates of the characteristic point to the camera to control the camera to focus on the characteristic.

The local processor may output eye coordinates of the user to the camera to control the camera to focus on the user.

At least one sensor may include a gravity sensor, and the local processor may determine a slope of the mobile terminal by using slope data detected by the gravity sensor and further consider the slope to rotate the image to be displayed.

The display unit may further include a memory storing image data, and the local processor may rotate the image to be displayed by using the image data stored in the memory.

The local processor may stop the control of the display panel if the image data processed in the host processor is output to the display unit.

Another exemplary embodiment of the present invention discloses a method for controlling a mobile terminal. The method includes: receiving data detected by at least one sensor; controlling the display panel by using data without intervention of an external host processor; and stopping the control of the display panel by a signal output from the external host processor.

The controlling of the display panel may include controlling brightness of the display panel by using illumination data detected by an illumination sensor.

The controlling of the display panel may further include rotating the image to be displayed by considering an arrangement relation of at least one characteristic point detected in a photography image photographed by the camera.

The controlling of the display panel may further include: detecting an eye of the user in the photography image; detecting a separation distance between the user and the camera by using the photography image; and expanding a region corresponding to the eye of the user in the image to be displayed if the separation distance is changed.

The method may further include controlling an exposure degree of the camera by using the illumination data.

The method may further include outputting coordinates of a characteristic point to the camera to control the camera to focus on the characteristic point.

The method may further include outputting eye coordinates of the user to the camera to control the camera to focus on the user.

The controlling of the display panel may include: determining a slope of the mobile terminal by using slope data detected by the gravity sensor; and rotating the image to be displayed by considering the slope.

An effect of a mobile terminal and a method for controlling the same according to the present invention are as follows.

According to at least one of the exemplary embodiments of the present invention, the image may be quickly displayed to the user.

Further, according to at least one of the exemplary embodiments of the present invention, power consumption according to the image display may be reduced.

In addition, according to at least one of the exemplary embodiments of the present invention, the object may be photographed in comfort.

An additional range of applicability of the present invention will become clear from the following detailed description. However, since various modifications and alterations within the spirit and scope of the present invention may be clearly understood by those skilled in the art, it is to be understood that the detailed description and specific exemplary embodiments of the present invention such as exemplary embodiments of the present invention are provided only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7, FIG. 9, and FIG. 11 are views exemplarily showing a screen displayed according to the method for controlling the mobile terminal related to the exemplary embodiment.

DETAILED DESCRIPTION OF THE EMBODIMENTS

Figure 1:
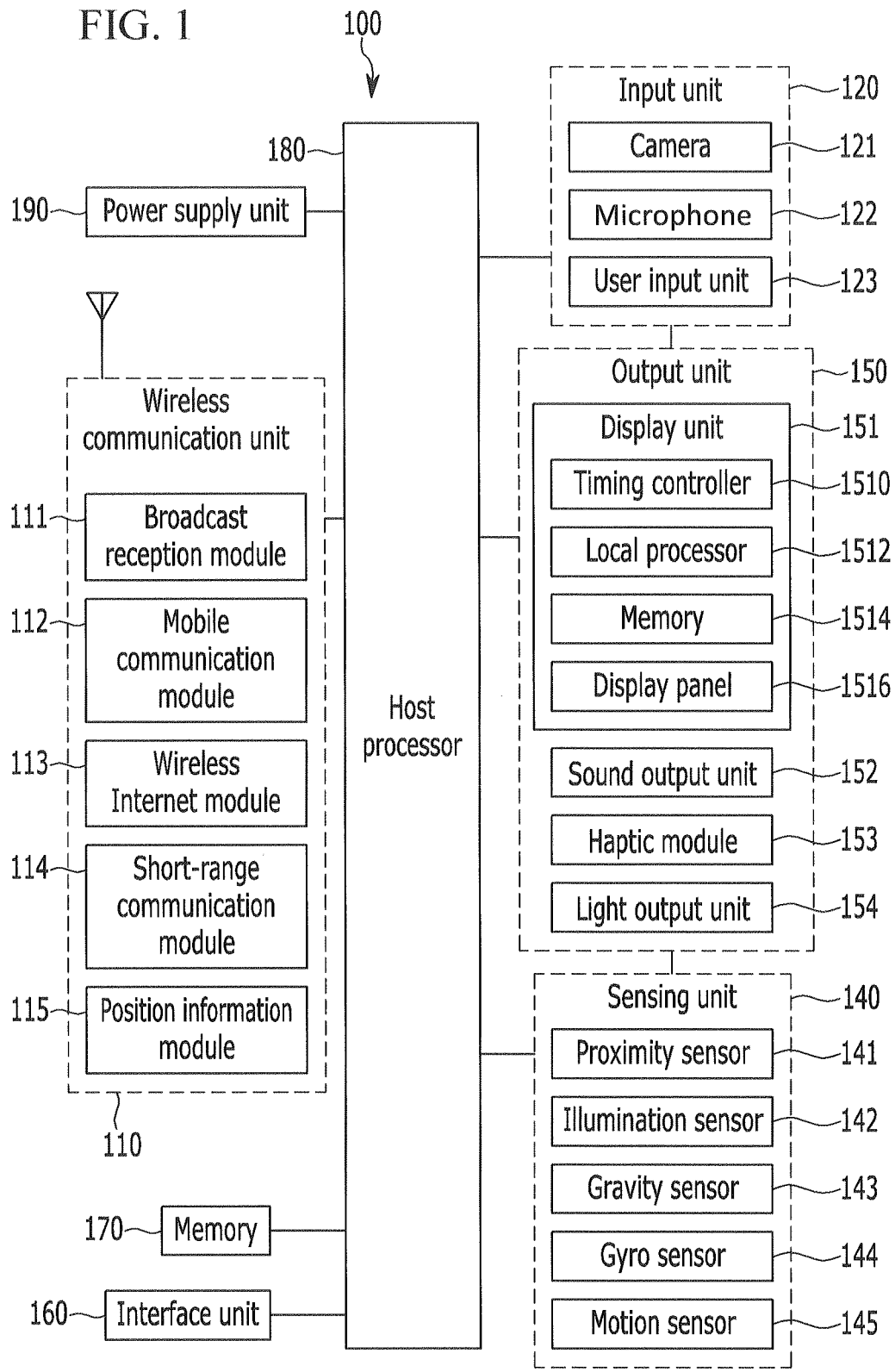
FIG. 1 is a block diagram to explain a mobile terminal related to the exemplary embodiment.

Hereinafter, exemplary embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to easily explain the specification. Therefore, these terms do not have meanings or roles that distinguish them from each other in themselves. Further, in describing exemplary embodiments of the present specification, when it is determined that a detailed description of the well-known art associated with the present invention may obscure the gist of the present invention, it will be omitted. In addition, the accompanying drawings are provided only to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without another component intervening therebetween.

Singular forms are to include plural forms unless the context clearly indicates otherwise.

It will be further understood that terms "comprise" or "have" used in the present specification specify the presence of stated features, numerals, steps, operations, components, parts, or a combination thereof, but do not preclude the presence or addition of one or more other features, numerals, steps, operations, components, parts, or combinations thereof.

The mobile terminal according to an exemplary embodiment may be applied to various electronic devices such as a digital TV, a desktop computer, digital signage, a mobile phone, a smart phone, a laptop computer, a digital broadcasting terminal, a personal digital assistant (PDA), a portable multimedia player (PMP), a navigation device, a slate PC, a tablet PC, an Ultrabook, a wearable device, for example, a watch-type terminal (a Smartwatch), a glass terminal (a smart glass), and a head mounted display (HMD).

However, the configuration according to an embodiment described in the present specification can be easily recognized by those skilled in the art that the invention may be applied to fixed terminals such as digital signage, digital TV, and a desktop computer, such that it is not only applied to the mobile terminal.

Figure 2:
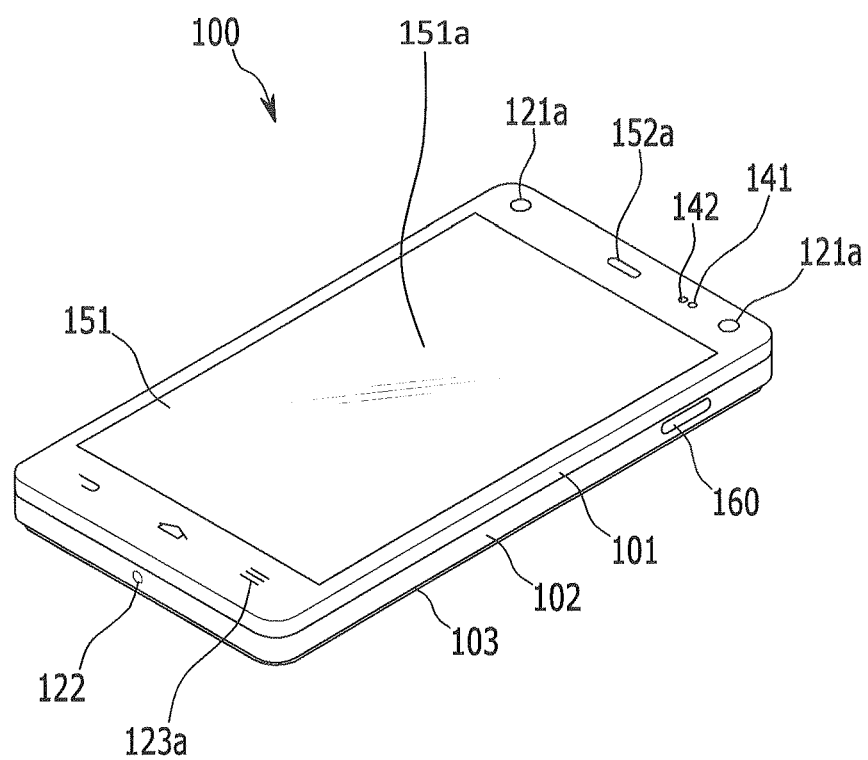
FIG. 2 is a schematic view of a mobile terminal related to the exemplary embodiment.

In reference to FIG. 1 and FIG. 2, FIG. 1 is a block diagram to explain a mobile terminal 100 related to the exemplary embodiment, and FIG. 2 is a schematic view of a mobile terminal 100 related to the exemplary embodiment.

The mobile terminal 100 may include a wireless communication unit 110, an input unit 120, a sensing unit 140, an output unit 150, an interface unit 160, a memory 170, a host processor 180, and a power supply unit 190. Constituent elements shown in FIG. 1 may be not essential to realize the mobile terminal, so the mobile terminal described in the present specification may include more or less constituent elements than the described constituent elements.

In detail, among the constituent elements, the wireless communication unit 110 may further include at least one module to connect the mobile terminal 100 and the other mobile terminal 100, or to connect the mobile terminal 100 and an external server for wireless communication. Also, the wireless communication unit 110 may further include at least one module connecting the mobile terminal 100 to at least one network.

The wireless communication unit 110 may include at least one of a broadcast reception module 111, a mobile communication module 112, a wireless Internet module 113, a short-range communication module 114, and a position information module 115.

The input unit 120 may include a camera 121 or an image input unit for an image signal input, a microphone 122 or an audio input unit for an audio signal input, or a user input unit 123 (for example, a touch key or a mechanical key) to receive information from the user. Voice data or image data collected in the input unit 120 is analyzed to be processed by a control order of the user.

The sensing unit 140 may include at least one sensor for sensing at least one of information in the mobile terminal, information regarding the environment surrounding the mobile terminal, and user information. For example, the sensing unit 140 may include at least one among a proximity sensor 141, an illumination sensor 142, a touch sensor, an acceleration sensor, a magnetic sensor, a G-sensor 143, a gyroscope sensor 144, a motion sensor 145, an RGB sensor, an IR sensor (an infrared sensor), a finger scan sensor, an ultrasonic wave sensor, an optical sensor (for example, a camera (referring to 121)), a microphone (referring to 122), a battery gauge, an environment sensor (e.g., a barometer, a hygrometer, a temperature sensor, a radiation detection sensor, a thermal sensor, a gas detection sensor, etc.), a chemical sensor (e.g., an electronic nose, a healthcare sensor, a biometric sensor, etc.). On the other hand, the mobile terminal disclosed in the present specification may be activated by combining the information sensed in at least two more sensors among these sensors.

The output unit 150 generates output related to a visual, an auditory, or a tactile sensation, and may include at least one of the display unit 151, an audio output unit 152, a haptic module 153, and a light output unit 154. The display unit 151 is made or formed integrally of a mutual layer structure with a touch sensor, thereby realizing the touch screen. The touch screen may function as a user input unit 123 providing an input interface between the mobile terminal 100 and the user, and may simultaneously provide an output interface between the mobile terminal 100 and the user.

The display unit 151 may include a display panel 1516 including a plurality of pixels and at least one driver, a timing controller 1510 appropriately supplying a image signal and a control signal to the display panel 1516, a local processor 1512 to drive the display unit 151 without intervention of an external host processor 180, and a memory 1514 storing an image signal.

The interface unit 160 forms a path with various external devices connected to the mobile terminal 100. These interface unit 160 may include at least one among a wire/wireless headset port, an external charger port, a wire/wireless data port, a memory card port, a port connecting a device having an identity module, an audio I/O (input/output) port, a video I/O port, and an earphone port. The mobile terminal 100 may perform appropriate control related to the connected external device corresponding to the interface unit 160 which is connected to the external device.

Also, the memory 170 stores the data supporting various functions of the mobile terminal 100. The memory 170 may store a plurality of application programs (or an application) driven in the mobile terminal 100, data for an operation of the mobile terminal 100, and commands. At least a portion of the application programs may be downloaded from the external server through the wireless communication. Also, at least a portion of the application programs may exist on the mobile terminal 100 from its factory for a basic function of the mobile terminal 100 (e.g., an incoming call function, a calling function, a message received function, and a calling function). On the other hand, the application program is stored to the memory 170 and is installed on the mobile terminal 100, thereby being driven to perform an operation (or a function) of the mobile terminal by the host processor 180.

The host processor 180 generally controls the entire operation of the mobile terminal 100 as well as the operation related to the application programs. The host processor 180 processes the signal, the data, and the information that are input or output through the above-described constituent elements or drives the application programs stored in the memory 170, thereby processing or providing the appropriate information or function to the user.

Also, the host processor 180 may control at least a portion among the constituent elements described along with FIG. 1 to drive the application program stored in the memory 170. Furthermore, the host processor 180 may combine and drive at least two among the constituent elements included in the mobile terminal 100 to drive the application programs.

The host processor 180 controls the operation related to the application programs and generally the entire operation of the mobile terminal 100. For example, if the state of the mobile terminal satisfies a predetermined condition, the host processor 180 may execute or cancel a locked state limiting input of control commands of the user for the applications.

Also, the host processor 180 may execute the control and the process related to the voice calls, the data communication, and the image calls, or can execute the pattern recognition process to recognize handwriting or figure drawing input to the touch screen as a character or an image. Furthermore, the host processor 180 may control any one among the above-described constituent elements or may combine and control a plurality of them.

The power supply unit 190 receives external power and internal power under the control of the host processor 180 to supply the power to the constituent elements included in the mobile terminal 100. The power supply unit 190 includes a battery, and the battery may be a replaceable battery or a built-in type of battery.

At least a portion of the constituent elements may work in cooperation with each other and be operated to realize the operation, the control, or the control method of the mobile terminal according to the described various exemplary embodiments. Also, the operation, the control, or the control method of the mobile terminal may be realized on the mobile terminal by the driving of at least one application program stored in the memory 170.

On the other hand, the various exemplary embodiments may be implemented in a computer or a recording medium that may be readable as a device similar thereto by using software, hardware, or a combination thereof.

In reference to FIG. 2, the disclosed mobile terminal 100 includes a terminal body with a bar shape. However, the present invention is not limited thereto, and may be applied to various structures such as a watch type, a clip type, a glass type, a folder type in which two or more bodies are coupled to be relatively movable, a flip type, a slide type, a swing type, and a swivel type. The mobile terminal may be related to a specific type; however, the description related to the specific type of the mobile terminal may be generally applied to mobile terminals of other types.

The mobile terminal 100 includes a case (for example, a frame, a housing, a cover, and the like) forming an external appearance. As shown, the mobile terminal 100 may include a front case 101 and a rear case 102. Various electronic parts are disposed in an inner space formed by the combination of the front case 101 and the rear case 102. At least one middle case may be additionally disposed between the front case 101 and the rear case 102.

The display unit 151 is disposed on the entire surface of the terminal thereby outputting information. As shown in the drawings, a window 151a of the display unit 151 is mounted to the front case 101 to form the entire surface of the terminal body along with the front case 101.

If necessary, the rear case 102 may be mounted with the electronic parts. A detachable battery, an identification module, a memory card and the like as the electronic parts may be attached or detached to the rear case 102. In this case, the rear case 102 may be combined with a rear surface cover 103 that can be attached and detached to cover the mounted electronic parts. Accordingly, if the rear surface cover 103 is separated from the rear case 102, the electronic parts mounted to the rear case 102 are exposed outside.

As shown in the drawing, if the rear surface cover 103 is combined to the rear case 102, the side of the rear case 102 may be partially exposed. If necessary, the rear case 102 may be completely covered by the rear surface cover 103 when combined. On the other hand, the rear surface cover 103 may include an opening to expose a camera 121b (not shown) or a sound output unit 152b (not shown) to the outside.

These cases 101, 102, and 103 may be formed by insert-injecting a synthetic resin, or may be formed of a metal, for example, stainless steel (STS), aluminum (Al), or titanium (Ti).

The mobile terminal 100 may be configured to provide the internal space to one case, differently from the above example in which a plurality of cases provide the internal space receiving the various electric parts. In this case, the mobile terminal 100 as a unibody in which the synthetic resin or the metal is connected from the side surface to the rear surface may be provided.

On the other hand, the mobile terminal 100 may include a waterproof portion (not shown) to prevent water from penetrating into the terminal body. For example, the waterproof portion may be provided between the window 151a and the front case 101, between the front case 101 and the rear case 102, or between the rear case 102 and the rear surface cover 103, and may include a waterproofing member closing and sealing the inner space when combining them.

In the mobile terminal 100, the display unit 151, first and second sound output units 152a and 152b, the proximity sensor 141, the illumination sensor 142, the camera 121 (121a, 121b), first and second operation units 123a and 123b, the microphone 122, and the interface unit 160 may be provided.

Hereinafter, as shown in FIG. 2, the mobile terminal 100 in which the display unit 151, the first sound output unit 152a, the proximity sensor 141, the illumination sensor 142, a first camera 121a, and the first operation unit 123a are disposed at the front surface of the terminal body, the second operation unit 123b, the microphone 122, and the interface unit 160 are disposed at the side surface of the terminal body, and the second sound output unit 152b (not shown) and the second camera 121b (not shown) are disposed at the rear surface of the terminal body will be described as an example.

However, these configurations are not limited to this arrangement. If necessary, these configuration may be omitted or replaced, or may be disposed at other surfaces. For example, the first operation unit 123a may not be provided at the front surface of the terminal body, and the second sound output unit 152b may be provided at the side surface of the terminal body, not the rear surface of the terminal body.

The display unit 151 outputs the information processed in the mobile terminal 100. For example, the display unit 151 may display the execution screen information of the application program driven in the mobile terminal 100 or a UI (user interface), or GUI (graphic user interface) information according to the execution screen information.

The display unit 151 may include at least one of a liquid crystal display (LCD), a thin film transistor liquid crystal display (TFT LCD), an organic light emitting diode display (OLED), a flexible display, a 3D display, and an e-ink display.

Also, two or more display units 151 may be provided according to the actual shape of the mobile terminal 100. In this case, a plurality of display units may be separated or integrally disposed at one surface of the mobile terminal 100, or may be respectively disposed at different surfaces.

The display unit 151 may receive the control command by a touch method, thereby including a touch sensor sensing the touch for the display unit 151. By using this, if the touch for the display unit 151 is generated, the touch sensor senses the touch, and the host processor 180 may generate the control command corresponding to the touch based on this. The content input by the touch method may be a character or a number, or an instruction in various modes or menu items to be specified.

On the other hand, the touch sensor including the touch pattern and formed of a film shape may be disposed between the window 151a and a display (not shown) on the rear surface of the window 151a, or may be a metal wire that is directly patterned on the rear surface of the window 151a. Also, the touch sensor may be integrally formed with the display. For example, the touch sensor may be disposed on the substrate of the display or may be provided inside the display. In this way, the display unit 151 may form the touch screen along with the touch sensor, and in this case, the touch screen may function as a user input unit 123 (referring to FIG. 1). If necessary, the touch screen may replace at least a partial function of the first operation unit 123a.

The first sound output unit 152a may be realized as a receiver transmitting a calling voice to an ear of the user, and the second sound output unit 152b may be realized as a loudspeaker outputting an alarm sound of a reproduced sound of a multimedia.

The window 151a of the display unit 151 may be formed with a sound hole for the sound generated by the first sound output unit 152a. However, the present invention is not limited thereto, and the sound may be configured to be emitted according to an assembly gap between structures (e.g., a gap between the window 151a and the front case 101). In this case, the hole independently formed for the sound output is apparently invisible or hidden, thereby simplifying the appearance of the mobile terminal 100.

The first camera 121a processes a static image obtained by the image sensor or an image frame of a motion picture in the photography mode or the image calling mode. The processed image frame may be displayed at the display unit 151 and may be stored in the memory 170.

The first camera 121*a* may include a plurality of lens arranged along at least one line. The plurality of lens may be arranged in a matrix. This camera is referred to as 'an array camera'. When the first camera 121*a* is configured as the array camera, the image may be photographed by various methods using a plurality of lens, thereby obtaining an image of excellent quality.

The first and second operation units 123*a* and 123*b* may be collectively referred as a manipulating portion as one example of the user input unit 123 operated to receive the commands to control the operation of the mobile terminal 100. The first and second operation units 123*a* and 123*b* may employ any kind of tactile method in which a tactile sense of touch, push, scroll, etc. is given to the user. Also, the first and second operation units 123*a* and 123*b* may employ a method that is operated with the tactile sense of the user through a proximity touch or a hovering touch.

In the present drawings, the first operation unit 123*a* is a touch key, however the present invention is not limited thereto. For example, the first operation unit 123*a* may be a mechanical key or may be formed of a combination of a touch key and a mechanical key.

The content input by the first and second operation units 123*a* and 123*b* may be variously set. For example, the first operation unit 123*a* may be input with a command such as a menu command, a home command, a cancel command, and a search command, and the second operation unit 123*b* may be input with a command such as a magnitude control command of the sound output in the first or second sound output units 152*a* and 152*b*, and a command for conversion into the touch recognition mode of the display unit 151.

Hereinafter, before describing the various exemplary embodiments realized by the mobile terminal 100, the above-arranged constituent elements will be described with reference to FIG. 3.

Figure 3:
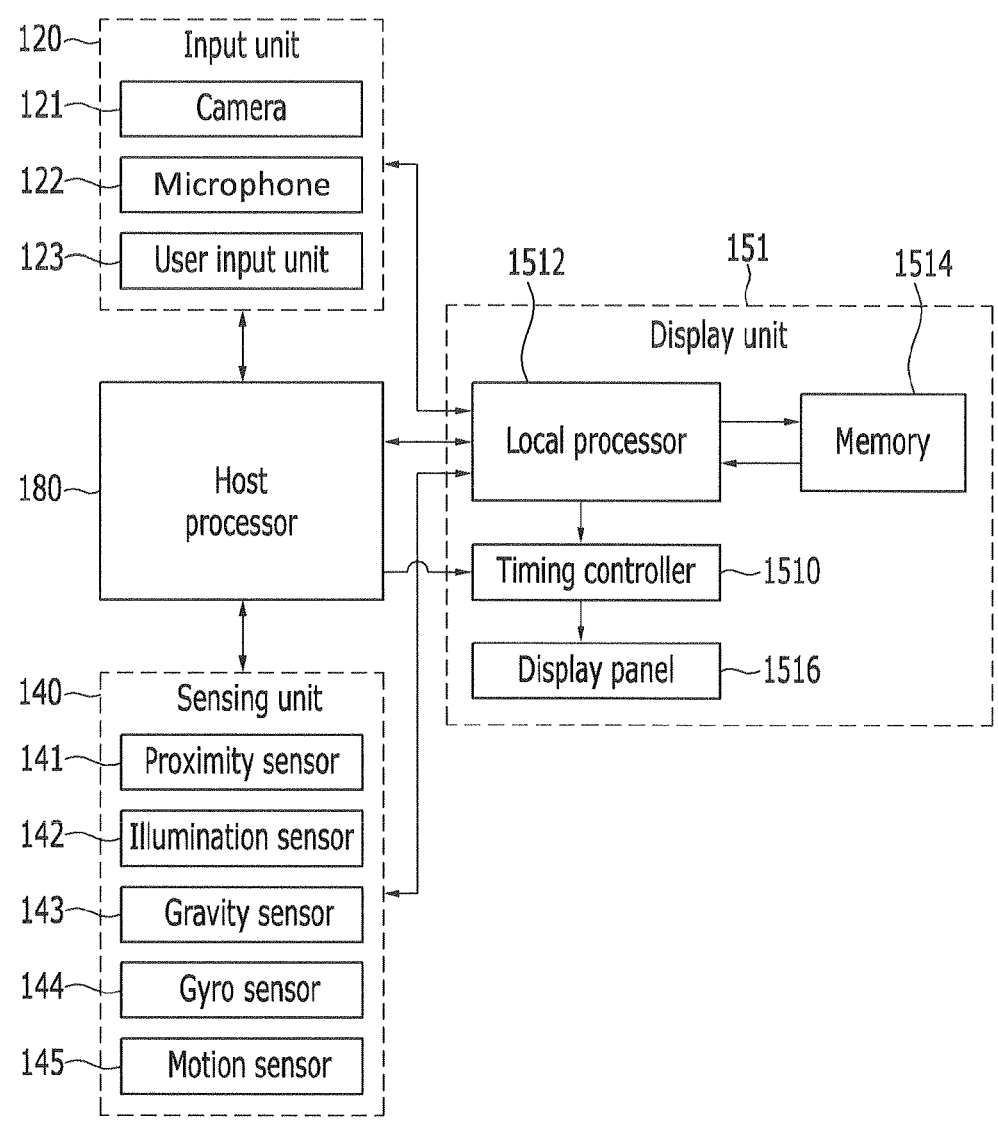
FIG. 3 is a block diagram to explain the input unit, the sensing unit, the display unit, and the controller of the mobile terminal of FIG. 1.

FIG. 3 is a block diagram to explain the input unit, the sensing unit, the display unit, and the controller of the mobile terminal of FIG. 1.

First, the input unit 120 is for the input of the image information (or the signal), the audio information (or the signal), the data, or the information input from the user, and the mobile terminal 100 may include one or a plurality of cameras 121 for the input of the image information. The camera 121 processes the image frame obtained by the image sensor in the image calling mode or the photography mode such as the static image or the motion picture. The processed image frame may be displayed on the display unit 151 or may be stored in the memory 170. On the other hand, a plurality of cameras 121 of the mobile terminal 100 may be disposed in the matrix, and through the cameras 121 of the matrix, the mobile terminal 100 may be input with multiple image information having various angles or focuses. Also, a plurality of cameras 121 may be disposed in a stereo structure to obtain a right image and a left image to realize a 3D image.

The microphone 122 processes and transforms the external sound signal into electronic voice data. The processed voice data may be variously activated according to the function (or the running application program) in the mobile terminal 100. On the other hand, a variety of noise removal algorithms may be implemented in the microphone 122 for removing noise generated in the process of receiving the external sound signal.

The user input unit 123 receives the information from the user, and if the information is input through the user input unit 123, the host processor 180 may control the operation of the mobile terminal 100 to correspond to the input information. The user input unit 123 may include a mechanical input means (or a mechanical key, for example, a button positioned at the front or rear surface or the side surface of the mobile terminal 100, a dome switch, a jog wheel, or a jog switch) and a touch type input means. As one example, the touch type input means may be formed of a virtual key, a soft key, or a visual key displayed at the touch screen through the software process, or a touch key disposed besides the touch screen. On the other hand, the virtual key or the visual key may be displayed on the touch screen while having various shapes, for example, they may be formed of a graphic, text, an icon, a video, or combinations thereof. Further, the sensing unit 140 senses at least one of the information on the mobile terminal, the information on the surrounding environment enclosing the mobile terminal, and the user information, thereby generating the corresponding sensing signal. The host processor 180 may control the driving or the operation of the mobile terminal 100 based on the sensing signal, or may execute the data process, the function, or the operation related to the application program installed to the mobile terminal 100. The representative sensors among the various sensors included in the sensing unit 140 will now be described in detail.

First, the proximity sensor 141 refers to a sensor that detects the presence or absence of an object in the vicinity of or approaching a predetermined detection surface by using electromagnetic field strength, infrared rays, etc., without the mechanical contact. The proximity sensor 141 may be disposed at the inner region of the mobile terminal enclosed by the above-described touch screen or in the vicinity of the touch screen.

Examples of the proximity sensor 141 include a transmission type of photoelectric sensor, a diffuse reflection photoelectric sensor, a retro-reflective photoelectric sensor, a high-frequency oscillation type of proximity sensor, a capacitance proximity sensor, a magnetic proximity sensor, and an infrared proximity sensor. In a case of the electrostatic touch screen, the proximity sensor 141 may be configured to detect the proximity of the object by a change in electrical field according to the proximity of an object with conductivity. In this case, the touch screen (or the touch sensor) may be classified as the proximity sensor itself.

The ultrasonic wave sensor may recognize the position information of the detected target by using ultrasonic waves and an ultrasonic sensor. On the other hand, the host processor 180 may calculate the position of the wave generation source through the information detected from the optical sensor and the plurality of ultrasonic sensors. The position of the wave generation source may be calculated by using a characteristic that light is very much faster than ultrasonic waves, that is, the time that the light takes to reach the optical sensor is very much shorter than the time that the ultrasonic wave takes to reach the ultrasonic sensor. In detail, the position of the wave generation source may be calculated by using the time difference between the ultrasonic waves with reference to the light signal.

On the other hand, in reference to the configuration of the input unit 120, the camera 121 includes at least one among a camera sensor (e.g., a CCD or CMOS sensor), a photosensor (or an image sensor), and a laser sensor.

The camera 121 and the laser sensor are combined, thereby sensing the touch of the sensing target for the 3D stereoscopic image. The photosensor may be disposed in the display element, in this case, and the photosensor may be made to scan the movement of the sensing target in the vicinity of the touch screen. In detail, the photosensor is mounted with a photodiode and a transistor (TR) in a row/column to scan the contents mounted on the photosensor by using the electronic signal that is changed according to the amount of the light applied to the photodiode. That is, the photosensor performs a coordinate calculation of the sensing target according to the change amount of the light, thereby obtaining the position information of the sensing target.

The display unit 151 outputs the information processed in the mobile terminal 100. For example, the display unit 151 may display the execution screen information of the application program driven in the mobile terminal 100, or the UI, and the GUI information according to the execution screen information.

Also, the display unit 151 may be configured as the three-dimensional display unit displaying the stereoscopic image.

The three-dimensional display unit may be applied to a stereoscopic system (a glass type), an autostereoscopic method (a non-glass type), and a projection system (a holographic method).

As described above, the display unit 151 may include the display panel 1516, the timing controller 1510, the local processor 1512, and the memory 1514.

The display panel 1516 may include a plurality of pixels expressing grays according to the supplied signal, a scan driver supplying a corresponding scan signal to a plurality of pixels, and a data driver supplying a corresponding data signal to a plurality of pixels.

The timing controller 1510 receives image information input from the outside and an input control signal controlling the display of the image information to image-process the image display signal to appropriately suit an operating condition of the display panel 1516. Also, the signal controlling the display panel 1516 may be generated and the generated signal may be output to the driver of the display panel 1516.

Next, the local processor 1512 is connected to the input unit 120, the sensing unit 140, and the host processor 180, and may receive the data from the input unit 120, the sensing unit 140, and the host processor 180 or may output the data to the input unit 120, the sensing unit 140, and the host processor 180. In this case, the data output from the input unit 120 and the sensing unit 140 may be input to the host processor 180 and the local processor 1512 in parallel.

The local processor 1512 generates the signal for displaying the image by using the data input from the input unit 120 and the sensing unit 140, and transmits the signal to the timing control them 1510 without intervention of the host processor 180.

The local processor 1512 reads the data from the memory 1514 of the display unit 151 without intervention of the host processor 180, thereby generating the signal to display the image.

Also, the local processor 1512 generates the signal controlling the input unit 120 and the sensing unit 140 by using the data input from the input unit 120 and the sensing unit 140 without intervention of the host processor 180, and outputs the signal to the input unit 120 and the sensing unit 140.

On the other hand, the local processor 1512 may stop the output of the signal generated in the local processor 1512 according to the signal input from the host processor 180. For example, while the image is displayed on the display panel 1516 by the local processor 1512, the image display by the local processor 1512 is stopped according to the signal input from the host processor 180 to the local processor 1512. In this case, the host processor 180 outputs the image signal to the timing controller 1510, thereby continuing the image display.

Next, the memory 1514 may temporarily store the image signal input from the host processor 180 or the local processor 1512. Also, the memory 1514 stores the data supporting the various functions of the local processor 1512. The memory 1514 may store a plurality of application programs driven in the local processor 1512 and the data for the operation of the display unit 151, and the commands. At least a portion of the application program may be downloaded from the external server through wireless communication.

Hereafter, the exemplary embodiments related to the control method realized in the above configured mobile terminal 100 will be described with reference to accompanying drawings. The present invention is apparent to those skilled in the art that may be embodied in other specific forms without departing from the spirit and essential characteristics of the invention.

Figure 4:
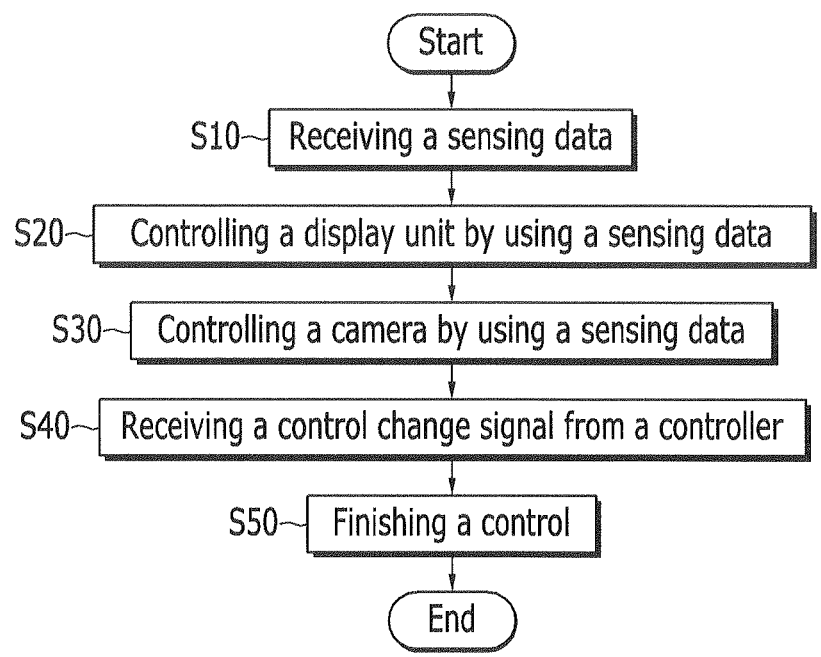
FIG. 4 is a flowchart to explain a method for controlling a mobile terminal related to the exemplary embodiment.

FIG. 4 is a flowchart to explain a method for controlling a mobile terminal related to the exemplary embodiment. First, the local processor 1512 receives the sensing data from the sensing unit 140 or the input unit 120 (S10).

For example, when the sensing unit 140 is the proximity sensor 141, the local processor 1512 may receive distance data, displacement data from the object sensed by the proximity sensor 141, and when the sensing unit 140 is the illumination sensor 142, the local processor 1512 may receive surrounding illumination data detected by the illumination sensor 142.

As another example, when the sensing unit 140 is the gravity sensor 143, the local processor 1512 may receive slope data detected by the gravity sensor 143, and when the sensing unit 140 is the gyro sensor, the local processor 1512 may detect degrees of freedom that are detected by the gyro sensor.

As still another example, when the input unit 120 is the camera 121, the local processor 1512 may receive the image data photographed by the camera 121.

The local processor 1512 may receive the data outputted by the input unit 120 or the sensing unit 140 included in the mobile terminal 100 in parallel to the host processor 180, however it is not limited thereto.

Next, the local processor 1512 controls the display unit 151 by using the sensing data without intervention of the host processor 180 (S20). The local processor 1512 can use the sensing data as it is, or the result data that is the processed sensing data.

The local processor 1512 may control the display unit 151 by considering the information determined from the sensing data. For example, the local processor 1512 may perform the control of the display brightness of the display unit 151. Also, the local processor 1512 may change the direction of the image displayed at the display unit 151 to be displayed, may stop or start the image display at the display unit 151, or may continue the image display. This will be described with reference to FIG. 4 to FIG. 11.

The local processor 1512 controls the input unit 120 by using the sensing data without intervention of the host processor 180 (S30). For example, the local processor 1512 may control the photography exposure degree of the camera 121 or the focusing of the camera 121 by using the sensing data, the processed sensing data, or the data determined from the sensing data.

Next, the local processor 1512 receives the control change signal from the host processor 180 (S40). The host processor 180 may execute the application program using the sensing data, may output the image signal generated by the execution of the application program or the control signal of the camera 121, and may simultaneously generate and transmit the control change signal to the local processor 1512.

When the image signal or the control signal of the camera 121 is generated by the host processor 180, a large amount of data is calculated or controlled, or processed by several steps, such that a delay according thereto may be generated.

Accordingly, before the data process in the host processor 180 is completed, the image display or the operation of the control of the camera 121 is controlled through the local processor 1512; if the host processor 180 completes the data process, the image display or the operation of the control of the camera 121 that was controlled in the local processor 1512 is continuously processed by the host processor 180, and the control change signal is transmitted to the local processor 1512 such that the control by the local processor 1512 is finished (S50).

Hereinafter, the method for controlling the mobile terminal 100 of FIG. 4 will be described with reference to FIG. 5 to FIG. 11.

Figure 5:
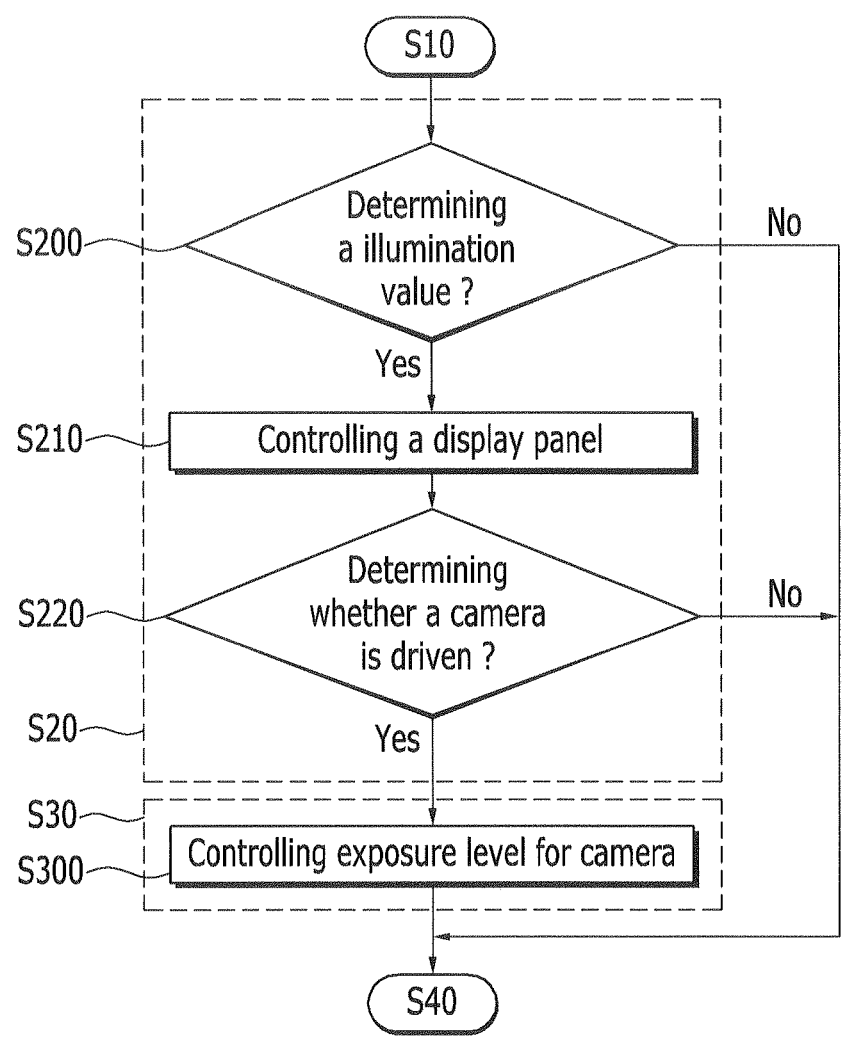
FIG. 5, FIG. 6, FIG. 8, and FIG. 10 are flowcharts showing the method for controlling a mobile terminal related to the exemplary embodiment.
Figure 6:
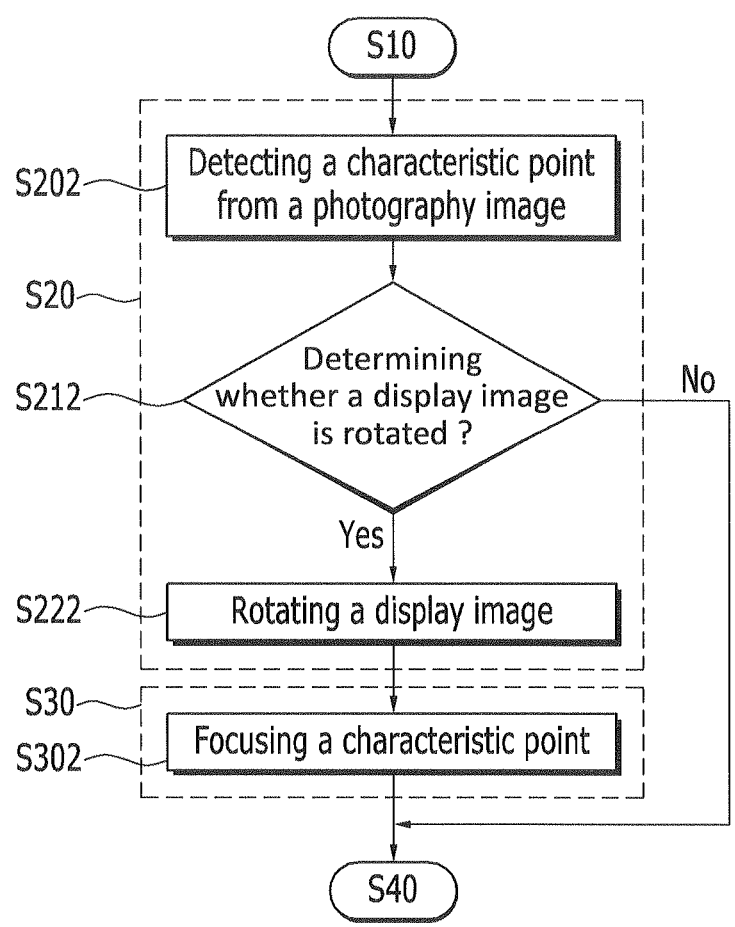
Figure 7:
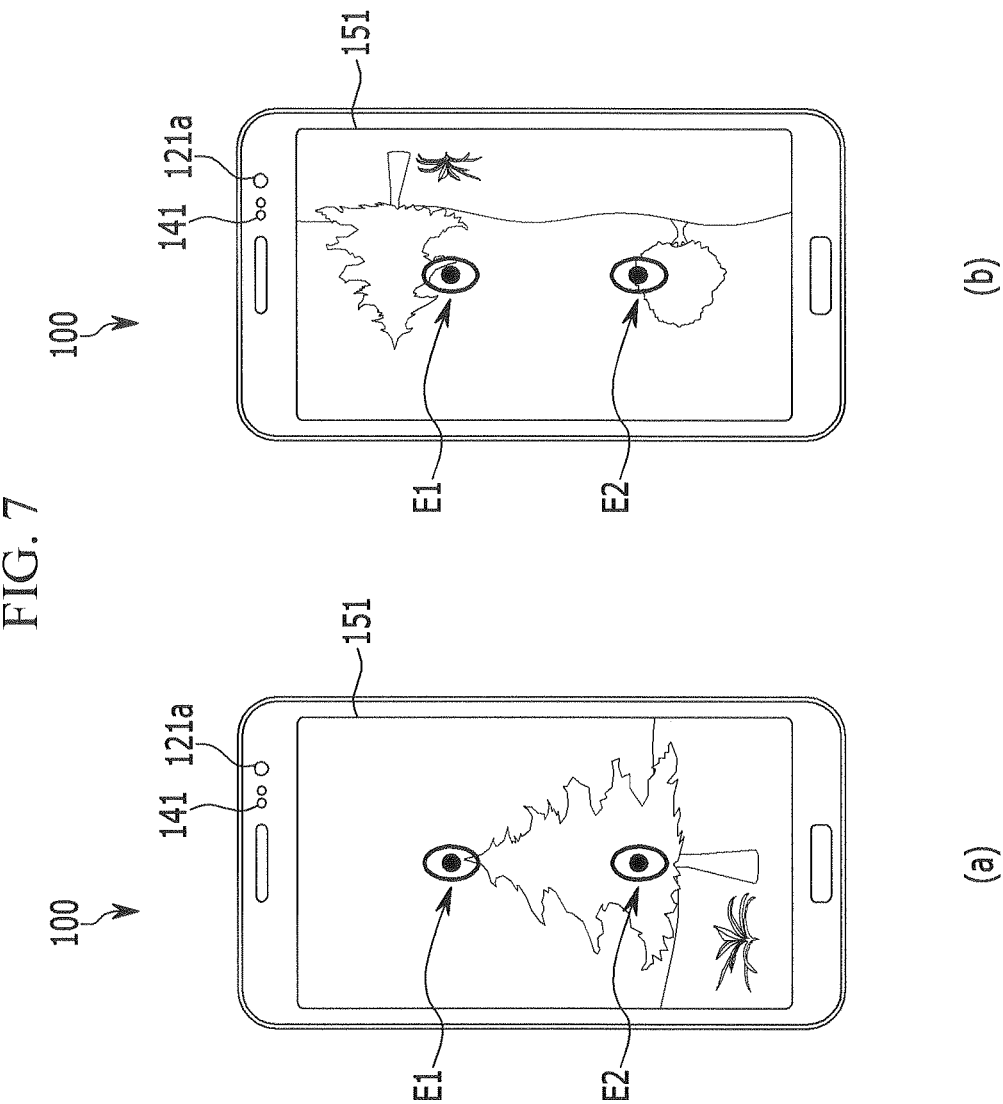
Figure 8:
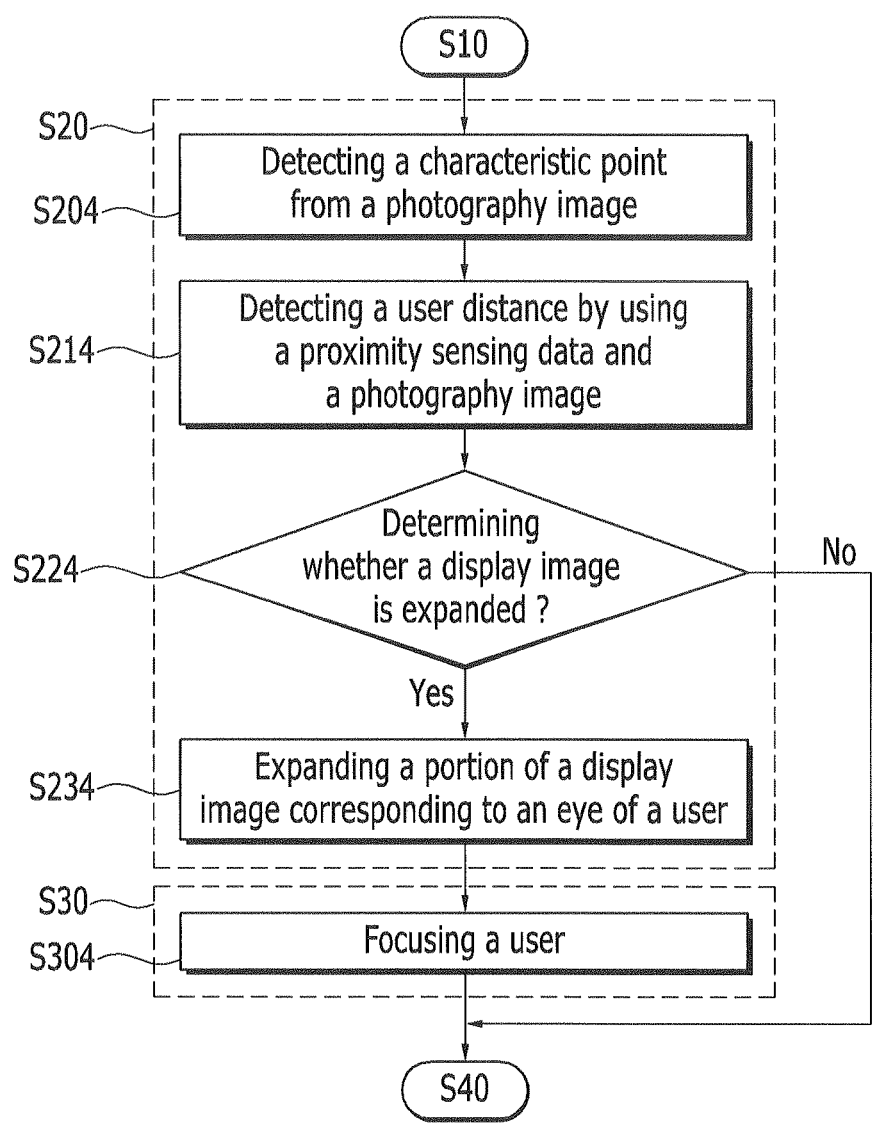
Figure 9:
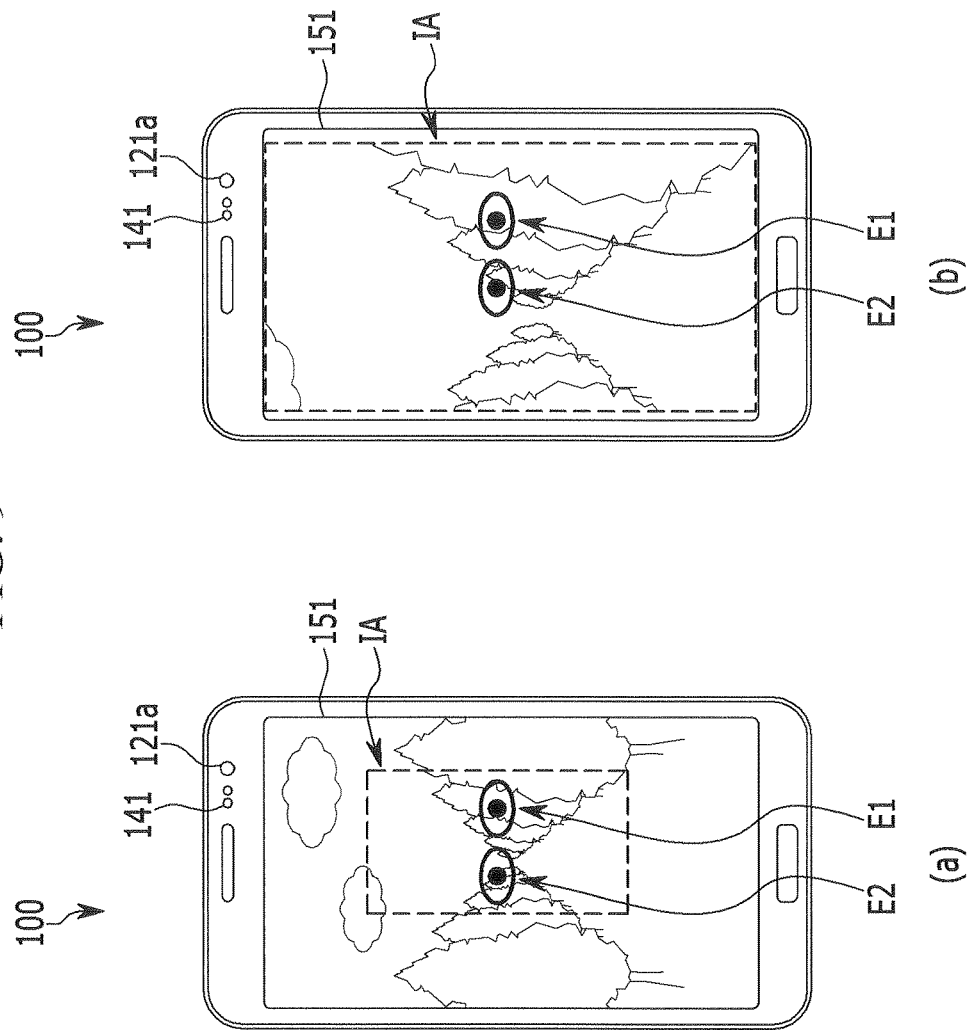

FIG. 5, FIG. 6, FIG. 8, and FIG. 10 are flowcharts showing the method for controlling a mobile terminal related to the exemplary embodiment, and FIG. 7, FIG. 9, and FIG. 11 are views exemplarily showing a screen displayed according to the method for controlling the mobile terminal related to the present invention.

First, to explain an exemplary embodiment, in reference to FIG. 5, the local processor 1512 determines the illumination near the mobile terminal 100 or near the front surface of the mobile terminal 100 by using the received illumination data (S200). For example, when the first operation unit 123a etc. is controlled by the user such that the image display of the display unit 151 is started, the illumination sensor 142 may detect the illumination surrounding the mobile terminal 100, and the local processor 1512 determines whether the detected illumination corresponds to the brightness of the displayed image.

When the illumination corresponds to the brightness of the image, the local processor 1512 executes the image display (S40).

When the illumination does not correspond to the brightness of the image, the local processor 1512 controls the display panel 1516 (S210). The local processor 1512 may change the value of the image signal output to the timing controller 1510 such that the brightness of the image displayed in the display panel 1516 is changed.

For example, when the brightness of the image is excessive compared with the surrounding illumination, the local processor 1512 performs the control of the brightness of the display panel 1516 to reduce the brightness of the displayed image. The local processor 1512 may perform the dimming for the backlight unit of the display panel 1516.

For another example, when the brightness of the image is insufficient compared the surrounding illumination, the local processor 1512 performs the control of increasing the luminance of the backlight unit to increase the brightness of the displayed image.

Next, the local processor 1512 determines whether the camera 121 is driven (S220). For example, when the mobile terminal 100 is in the standby mode, the camera 121 may be driven through the predetermined gesture such that the local processor 1512 may determine the driving of the camera 121.

If it is determined that the camera 121 is driven, the local processor 1512 controls the exposure of the camera 121 by using the illumination data without the intervention of the host processor 180 (S300). For example, compared with the surroundings illumination, when the current value of the predetermined exposure of the camera 121 is excessive or insufficient, the local processor 1512 may adjust the shutter speed, the shutoff degree, or the exposure value of the camera 121.

Accordingly, the local processor 1512 controls the brightness of the display panel 1516 or the exposure of the camera 121 without the intervention of the host processor 180 such that the user can comfortably use the mobile terminal 100, so it is possible to reduce power consumption.

Next, to describe another exemplary embodiment, in reference to FIG. 6 and FIG. 7, the local processor 1512 receives the photograph image from the camera 121 to detect a characteristic point of the photography image (S202).

For example, the local processor 1512 detects the characteristic point of the face of the user in the image photographed by the camera 121 through a face recognition algorithm, or an eye of the user face in the image photographed by the camera 121 through a recognition algorithm.

Also, the local processor 1512 determines whether the displayed image is rotated to be displayed by considering the detected characteristic point and the direction of the image that is currently displayed (S212). If it is determined to rotate the display image to be displayed, the local processor 1512 rotates the display image to be displayed (S222).

In reference to FIG. 7 (a) in this regard, the image that is currently displayed is displayed with a portrait orientation; however, if it is determined that two eyes E1 and E2 of the user are appropriate for the image displayed with a landscape orientation, as shown in FIG. 7 (b), the local processor 1512 may rotate the image that is currently displayed to the landscape orientation to be displayed.

Also, the local processor 1512 may rotate the image to be displayed by changing the method of reading the image data stored in the memory 1514. For example, when the memory 1514 stores the image data in a column method, the local processor 1512 may rotate the screen to be displayed by reading the image data in a row method.

Next, the local processor 1512 controls the camera 121 to focus the characteristic detected in the photography image (S302). When the face of the user is detected in the photograph image, the local processor 1512 may control the camera 121 for the focus of the camera 121 to be set to coordinates corresponding to the face of the user in the image.

Accordingly, the local processor 1512 rotates the display image to be displayed without the intervention of the host processor 180 such that a delay of less than the time taken for the host processor 180 to rotate the image to be displayed may be generated and the coordinates of the characteristic point detected in the photography image are output to the camera 121 such that the less delay is generated when the camera 121 focuses the characteristic point, such the user may use the mobile terminal 100 in comfort.

To describe another exemplary embodiment, in reference to FIG. 8 and FIG. 9, the local processor 1512 receives the photograph image from the camera 121 to detect an eyes of the user of the photography image (S204). The local processor 1512 may detect the eyes of the user by using a plurality of images photographed by the plurality of the cameras 121a provided on the front surface of the mobile terminal 100.

For example, the local processor 1512 recognizes the face of the user in a plurality of images, detects the eyes of the user, and determines the depth value of the eyes to detect the eyes of the user, and may also determine the eye direction of the user for the display unit 151.

Also, the local processor 1512 detects the separation distance of the user from the front surface of the mobile terminal 100 by using the proximity sensing data or the photography image (S214).

The local processor 1512 determines whether the displayed image is expanded to be displayed according to the change of the separation distance that is detected during a predetermined time (S224), and if it is determined that the display image is expanded to be displayed, the local processor 1512 expands a region corresponding to the eye of the user in the display image (S234).

In this regard, in reference to FIG. 9 (a), the local processor 1512 may determine the interest region IA toward which the eyes E1 and E2 of the user are directed in the image that is currently displayed. Also, if the separation distance is decreased during the predetermined time, the local processor 1512 may expand the interest region IA to be displayed, as shown in FIG. 9 (b).

Next, the local processor 1512 controls the camera 121 to focus the user detected in the photography image (S304). The eyes of the user are detected in the photograph image such that the local processor 1512 may control the camera 121 for the focus of the camera 121 to be set to the coordinates corresponding to the face of the user in the image.

Accordingly, the local processor 1512 displays the display image to be expanded without the intervention of the host processor 180 such that the host processor 180 may have a delay of less than the time it takes for the image to be expanded to be displayed, and the coordinates of the user face detected in the photography image are output to the camera 121 such that the local processor 1512 may have the decreased delay when the camera 121 focuses the face of the user, such that the user may user the mobile terminal 100 in comfort.

Figure 10:
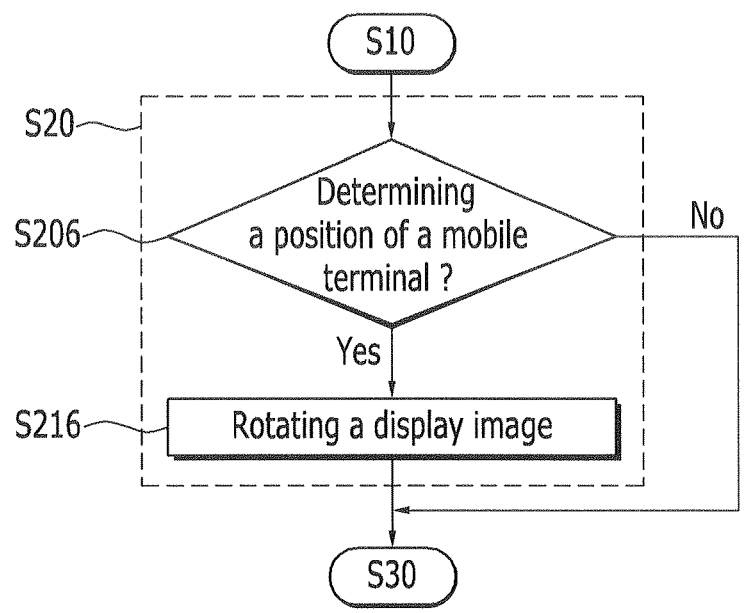

Next, to describe another exemplary embodiment, in reference to FIG. 10 and FIG. 11, the local processor 1512 receives the sensing data detected from at least one among the gravity sensor 143, the gyroscope sensor 144, and the motion sensor 145 to determine the position of the mobile terminal 100 (S206).

For example, the local processor 1512 may determine the direction that the mobile terminal 100 is inclined by using the slope data of the mobile terminal 100 detected by the gravity sensor 143. Also, the local processor 1512 may determine the direction that the mobile terminal 100 is inclined by further considering a 6 orientation freedom degree of the mobile terminal 100 detected from the gyroscope sensor 144. Further, the local processor 1512 rotates the display image to be displayed by corresponding to the position of the mobile terminal 100 (S222).

In this regard, in reference to FIG. 11 (a), the image that is currently displayed is displayed with the portrait orientation, and if it is determined that the position of the mobile terminal 100 is suitable to the landscape orientation, as shown in FIG. 11 (b), the local processor 1512 may rotate the displayed image to the landscape orientation to be displayed.

Also, the local processor 1512 changes the method of reading the image data stored in the memory 1514 to rotate the image to be displayed. For example, when the image data is stored to the memory 1514 with the column method, the local processor 1512 may read the image data with the row method to rotate the screen to be displayed.

Accordingly, the local processor 1512 rotates the display image to be displayed without the intervention of the host processor 180 such that the host processor 180 may have the delay of less than the time it takes for the image to be rotated to be displayed, such that the user may user the mobile terminal 100 in comfort.

The present invention may be implemented by a computer readable medium in which a program is recorded. The computer readable medium may include all kinds of recording apparatuses in which data that may be read by a computer system are stored. An example of the computer readable medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disk, an optical data storage, or the like, and may also include a medium implemented in a form of a carrier wave (for example, transmission through the Internet). In addition, the computer may also include the host processor 180 of the terminal or the local processor 1512 of the display unit. Therefore, the above detailed description is not to be interpreted as being restrictive, but is to be considered as being illustrative. The scope of the present invention is to be determined by reasonable interpretation of the claims, and all alterations within equivalencies of the present invention fall within the scope of the present invention.

| <Description of Symbols> | |
|---|---|
| 100: mobile terminal | 110: wireless communication unit |
| 120: input unit | |
| 140: sensing unit | 150: output unit |
| 151: display unit | 160: interface unit |
| 170: memory | 180: controller |
| 190: power supply unit | 1510: timing controller |
| 1512: local processor | 1514: memory |
| 1516: display panel | |

What is claimed is:

1. A mobile terminal, comprising:
at least one sensor;
a display unit; and
a host processor receiving data detected by the at least one sensor and processing image data of which a display is changed according to the data detected by the sensor,
wherein the display unit includes:
a display panel displaying an image according to the image data; and
a local processor receiving the data detected by the sensor and controlling the display panel by using the data detected by the sensor without intervention of the host processor,
wherein the at least one sensor includes a camera, and
wherein the local processor receives photography image data photographed by the camera, and detects the separation distance to expand a region corresponding to the eye of the user in the image to be displayed when a separation distance between the user and the mobile terminal is changed.

2. The mobile terminal of claim 1, wherein the at least one sensor further includes an illumination sensor, and the local processor controls a brightness of the display panel by using illumination data detected by the illumination sensor.

3. The mobile terminal of claim 2, wherein the local processor receives photography image data photographed by the camera and rotates the image to be displayed by considering an arrangement relation of at least one characteristic point detected in the photography image.

4. The mobile terminal of claim 3, wherein the local processor controls an exposure degree of the camera by using the illumination data.

5. The mobile terminal of claim 3, wherein the local processor outputs coordinates of the characteristic point to the camera to control the camera to focus on the characteristic point.

6. The mobile terminal of claim 3, wherein the at least one sensor includes a gravity sensor, and the local processor determines a slope of the mobile terminal by using slope data detected by the gravity sensor and further considers the slope to rotate the image to be displayed.

7. The mobile terminal of claim 6, wherein the display unit further includes a memory storing the image data, and the local processor rotates the image to be displayed by using the image data stored in the memory.

8. The mobile terminal of claim 1, wherein the local processor outputs eye coordinates of the user to the camera to control the camera to focus on the user.

9. The mobile terminal of claim 1, wherein when the image data processed in the host processor is output to the display unit, the local processor stops the control of the display panel.

10. A method for controlling a mobile terminal, the method comprising steps of:
receiving data detected by at least one sensor;
controlling a display panel by a local processor by using the detected data without intervention of an external host processor; and
when a signal output is transmitted from the external host processor to the local processor, stopping the control of the display panel by the local processor,
wherein the controlling of the display panel further includes steps of:
detecting an eye of a user in a photography image photographed by a camera;
detecting a separation distance between the user and the camera by using the photography image; and
when the separation distance is changed, expanding a region corresponding to the eye of the user in the image to be displayed.

11. The method of claim 10, wherein the controlling of the display panel includes a step of controlling a brightness of the display panel by using an illumination data detected by an illumination sensor.

12. The method of claim 11, wherein the controlling of the display panel further includes:
rotating the image to be displayed by considering an arrangement relation of at least one characteristic point detected in the photography image.

13. The method of claim 12, further comprising a step of controlling an exposure degree of the camera by using the illumination data.

14. The method of claim 12, further comprising a step of outputting coordinates of a characteristic point to the camera to control the camera to focus on the characteristic point.

15. The method of claim 10, further comprising a step of outputting eye coordinates of the user to the camera to control the camera to focus on the user.

16. The method of claim 10, wherein the controlling of the display panel includes steps of:
determining a slope of the mobile terminal by using slope data detected by a gravity sensor; and
rotating the image to be displayed by considering the slope.

17. A mobile terminal, comprising:
a camera capturing a photographic image of a human user that includes the human user's eyes;
a proximity sensor that determines a separation distance between the human user and the mobile terminal;
a display unit having a display panel and a local processor that only controls the display panel, the local processor receives data detected by the camera and proximity sensor; and
an external host processor is connected to the display unit, the camera and the proximity sensor and controls the mobile terminal,
wherein when a signal is transmitted from the external host processor to the local processor control of the display panel by the local processor is terminated,
wherein when the separation distance between the user and the mobile terminal decreases, the local processor detects the decreased separation distance and crops an image displayed on the display panel based on a location on the display panel the human user's eyes are focusing and expands the cropped image to fill the display panel, and
wherein the local processor and the external host processor are different processors.

* * * * *